(12) United States Patent
Ceborahs et al.

(10) Patent No.: US 11,878,796 B2
(45) Date of Patent: Jan. 23, 2024

(54) PERCHING UAV WITH RELEASABLE CRAWLER

(71) Applicant: Saudi Arabian Oil Company, Dhahran (SA)

(72) Inventors: Maksims Ceborahs, Klagenfurt (AT); Fadl Abdellatif, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 280 days.

(21) Appl. No.: 17/444,135

(22) Filed: Jul. 30, 2021

(65) Prior Publication Data

US 2023/0034243 A1  Feb. 2, 2023

(51) Int. Cl.
| | | |
|---|---|---|
| *B64C 39/02* | (2023.01) | |
| *B64D 1/02* | (2006.01) | |
| *B62D 57/024* | (2006.01) | |
| *B60B 19/00* | (2006.01) | |
| *G01N 29/24* | (2006.01) | |
| *G01N 29/22* | (2006.01) | |

(Continued)

(52) U.S. Cl.
CPC .......... *B64C 39/024* (2013.01); *B60B 19/006* (2013.01); *B62D 57/024* (2013.01); *B64D 1/02* (2013.01); *G01N 29/225* (2013.01); *G01N 29/2493* (2013.01); *B64U 30/20* (2023.01); *B64U 50/19* (2023.01); *B64U 70/00* (2023.01); *B64U 2101/00* (2023.01)

(58) Field of Classification Search
CPC .. B64C 39/024; B64U 30/20; B64U 2101/00; B62D 57/024; B60B 19/006
See application file for complete search history.

(56) References Cited

U.S. PATENT DOCUMENTS

| | | | |
|---|---|---|---|
| 2017/0197718 A1* | 7/2017 | Buchmueller | ........... B64D 1/22 |
| 2019/0015971 A1* | 1/2019 | Carrasco Zanini | .. B62D 57/024 |

(Continued)

FOREIGN PATENT DOCUMENTS

| | | | | |
|---|---|---|---|---|
| WO | WO-2021089896 A1 * | 5/2021 | .............. | B25J 11/00 |

OTHER PUBLICATIONS

Fadl Abdellatif et al., U.S. Appl. No. 17/107,829, filed Nov. 30, 2020; System and Method for Passive Normalization of a Probe.

(Continued)

*Primary Examiner* — Michael H Wang
(74) *Attorney, Agent, or Firm* — Leason Ellis LLP (57) ABSTRACT

An unmanned aerial vehicle (UAV) a fixed frame and a rotating arm pivotably coupled to the fixed frame at a central axis. The fixed frame includes peripheral propellers and corresponding motors for flying the UAV, and a central electronics enclosure for housing electronics used to control the UAV. The rotating arm is between the propellers and configured to rotate with respect to the fixed frame about the central axis. The rotating arm includes magnetic feet at a first end of the rotating arm and configured to perch and magnetically attach the UAV to a ferromagnetic surface, a docking station at the first end and configured to release and dock a releasable crawler, and a battery at a second end of the rotating arm opposite the first end and configured to supply power to the motors and the housed electronics, and to counterbalance the first end about the central axis.

9 Claims, 9 Drawing Sheets

(51) Int. Cl.
    *B64U 30/20*     (2023.01)
    *B64U 50/19*     (2023.01)
    *B64U 70/00*     (2023.01)
    *B64U 101/00*    (2023.01)

(56) References Cited

U.S. PATENT DOCUMENTS

| | | | |
|---|---|---|---|
| 2019/0152544 A1* | 5/2019 | Outa | B08B 1/002 |
| 2020/0166938 A1* | 5/2020 | Hafenrichter | G05D 1/101 |
| 2020/0172184 A1 | 6/2020 | Abdellatif et al. | |
| 2020/0172231 A1* | 6/2020 | Abdellatif | G08G 5/0069 |
| 2020/0172232 A1* | 6/2020 | Abdellatif | G01N 29/2493 |
| 2020/0174478 A1* | 6/2020 | Abdellatif | B62D 21/09 |
| 2020/0207488 A1* | 7/2020 | Troy | B64F 5/60 |
| 2020/0307786 A1* | 10/2020 | Tavakolikhakaledi | B64C 39/022 |
| 2021/0268640 A1* | 9/2021 | Clarke | A01M 29/32 |
| 2021/0314490 A1* | 10/2021 | Kalinowski | H04N 23/6812 |
| 2022/0169072 A1* | 6/2022 | Abdellatif | B60B 19/12 |
| 2023/0110540 A1* | 4/2023 | Rehman | G01N 29/043 |
| | | | 701/23 |

OTHER PUBLICATIONS

Fadl Abdellatif et al., U.S. Appl. No. 17/107,768, filed Nov. 30, 2020; Magnetic Crawler With 3 Articulated Wheels for Navigation on Pipes.

Fadl Abdellatif et al., U.S. Appl. No. 17/111,297, filed Dec. 3, 2020; Mechanism for Docking a Magnetic Crawler Into a UAVV.

Fadl Abdellatif et al., U.S. Appl. No. 17/107,715, filed Nov. 30, 2020; Bi-Stable and Switchable Magnetic Legs for UAV Landing on Curved Surfaces.

* cited by examiner

PERCHING UAV WITH RELEASABLE CRAWLER

FIELD OF THE DISCLOSURE

The present disclosure relates generally to the inspection and maintenance of a structure, and specifically to a perching unmanned aerial vehicle (UAV or drone) having a releasable crawler for inspecting and maintaining the structure.

BACKGROUND OF THE DISCLOSURE

The inspection and maintenance of exposed metallic assets, such as pipes, storage tanks, and the like, can be difficult or impractical to perform by humans in some environments. In such circumstances, the use of automated UAV's (or drones) may assist in providing a workable alternative. However, such inspection and maintenance tasks are often best performed using direct contact on the asset, versus hovering at a distance from the asset, or maneuvering a UAV on the asset. In particular, performing a complete circumferential scan of a pipe (or other asset) using a drone is a challenging task.

It is in regard to these and other problems in the art that the present disclosure is directed to provide a technical solution for an effective perching UAV having a releasable crawler for inspecting or maintaining a structure.

SUMMARY OF THE DISCLOSURE

According to a first aspect of the disclosure, an unmanned aerial vehicle (UAV) comprises: a fixed frame including peripheral propellers and corresponding motors for flying the UAV, and a central electronics enclosure for housing electronics used to control the UAV; and a rotating arm pivotably coupled to the fixed frame at a central axis between the propellers and configured to rotate with respect to the fixed frame about the central axis. The rotating arm includes: magnetic feet at a first end of the rotating arm and configured to perch and magnetically attach the UAV to a ferromagnetic surface; a docking station at the first end and configured to release and dock a releasable crawler on and from the ferromagnetic surface; and a battery at a second end of the rotating arm opposite the first end and configured to supply power to the motors and the housed electronics, and to counterbalance the first end about the central axis.

In an embodiment consistent with the above, the first end of the rotating arm is adjustable to accommodate vertical and horizontal pipes as the ferromagnetic surface.

In an embodiment consistent with the above, the rotating arm extends along a longitudinal axis perpendicular to the central axis and going through the docking station, and the first end of the rotating arm is reconfigurable to rotate the first end about the longitudinal axis relative to a remainder of the docking station by 90°.

In an embodiment consistent with the above, the rotation arm further comprises a payload motor powered by the battery and configured to rotate the first end of the rotating arm about the longitudinal axis relative to the remainder of the docking station.

In an embodiment consistent with the above, the rotating arm is further configured to: rotate its first end down with respect to the fixed frame in order to perch the UAV and release the crawler on a top of the ferromagnetic surface; rotate its first end up with respect to the first frame in order to perch the UAV and release the crawler on a bottom of the ferromagnetic surface; and rotate its first end even with respect to the fixed frame in order to perch the UAV and release the crawler on a side of the ferromagnetic surface.

In an embodiment consistent with the above, the magnetic feet are further configured to passively pivot in a first orientation in order to perch and magnetically attach the UAV to a flat ferromagnetic surface, and passively pivot in a second orientation different from the first orientation in order to perch and magnetically attach the UAV to a curved ferromagnetic surface exhibiting cylindrical curvature.

In an embodiment consistent with the above, the magnetic feet are further configured to passively pivot in the second orientation in order to perch and magnetically attach the UAV to a curved ferromagnetic surface exhibiting cylindrical curvature with a first radius of curvature, and to passively pivot in a third orientation different from the first and second orientations in order to perch and magnetically attach the UAV to a curved ferromagnetic surface exhibiting cylindrical curvature with a second radius of curvature different from the first radius of curvature.

In an embodiment consistent with the above, the magnetic feet comprise switchable magnets powered by the battery and configured to switch their magnetism on and off under control of the housed electronics, the switchable magnets being further configured to: switch their magnetism on in order to magnetically attach the UAV to the ferromagnetic surface during a perching of the UAV on the ferromagnetic surface; and switch their magnetism off in order to magnetically detach the perched UAV from the ferromagnetic surface during a takeoff of the UAV from the ferromagnetic surface.

In an embodiment consistent with the above, the UAV further comprises a rotation motor powered by the battery and configured to rotate the rotating arm with respect to the fixed frame about the central axis under control of the housed electronics during flight of the UAV.

According to another aspect of the disclosure, a docking station for an unmanned aerial vehicle (UAV) and configured to house a releasable magnetic crawler during flight of the UAV, and to release and dock the magnetic crawler while the UAV is perched on a curved ferromagnetic surface exhibiting cylindrical curvature having a radius of curvature. The docking station comprises: a ferromagnetic docking sheet having a top surface for holding and magnetically attaching to the magnetic crawler and a bottom surface for tangentially contacting the curved ferromagnetic surface at an inside edge of the docking sheet coinciding with and perpendicular to a centerline of the UAV; and an actuator for moving the docking sheet and magnetically attached crawler along the centerline between a retracted position and a deployed position, the retracted position being closer to a center of the UAV and further from the curved ferromagnetic surface than the deployed position, the deployed position varying with the radius of curvature of the curved ferromagnetic surface, the retracted position being for storing the docking sheet and attached crawler during flight as well as during landing on and takeoff from the curved ferromagnetic surface, the deployed position being for releasing the magnetic crawler on and docking the magnetic crawler from the curved ferromagnetic surface when the inside edge of the docking sheet tangentially contacts the curved ferromagnetic surface.

In an embodiment consistent with the docking station described above, the actuator comprises a motor or a linear actuator.

In an embodiment consistent with the docking station described above, the docking station is further configured to release and dock the magnetic crawler while the UAV is perched on a flat ferromagnetic surface, wherein the docking sheet rests flat on the flat ferromagnetic surface when the docking sheet is in the deployed position.

In an embodiment consistent with the docking station described above, a UAV that comprises the docking station is provided. The UAV further comprises a fixed frame and a rotating arm pivotably coupled to the fixed frame at a central axis and configured to rotate with respect to the fixed frame about the central axis, the rotating arm including the docking station at one end and a battery for powering the UAV at another end.

In an embodiment consistent with the docking station described above, the docking further comprises the releasable magnetic crawler, wherein the magnetic crawler comprises magnetic wheels configured through contact and magnetic attachment to drive the magnetic crawler from an outside edge of the docking sheet opposite the inside edge to the curved ferromagnetic surface through the tangential contact region during a release of the docked magnetic crawler from the docking station, and from the curved ferromagnetic surface to the outside edge of the docking sheet through the tangential contact region during a docking of the released magnetic crawler.

According to another aspect of the disclosure, a releasable magnetic crawler for docking in and releasing from a docking station of an unmanned aerial vehicle (UAV), from or to a curved ferromagnetic surface exhibiting cylindrical curvature is provided. The crawler has a center of mass defining a front and a rear of the crawler and defining a right side and a left side of the crawler. The crawler comprises: a body including a draggable tail; a first magnetic drive wheel in the front left side of the crawler and coupled to a left side of the body, the first magnetic drive wheel being configured to magnetically attach to and drive on the ferromagnetic surface in forward and backward directions; and a second magnetic drive wheel in the front right side of the crawler and coupled to a right side of the body, the second magnetic drive wheel being configured to magnetically attach to and drive on the ferromagnetic surface in forward and backward directions, the first and second magnetic drive wheels being configured to drive independently of each other in order to magnetically attach the crawler to the ferromagnetic surface and to drive the crawler on the ferromagnetic surface in any direction, wherein the draggable tail has a nonrotating contact surface in the rear of the crawler configured to rest on, drag over, and not rotate with respect to the ferromagnetic surface in response to the driving of the first and second magnetic drive wheels.

In an embodiment consistent with the crawler described above, the crawler further comprises one or more permanent magnets mounted to the draggable tail and configured to provide support to the crawler and to provide magnetic adhesion of the draggable tail to the ferromagnetic surface.

In an embodiment consistent with the crawler described above, the contact surface comprises a polymer or rubber coating configured to prevent scratching of the ferromagnetic surface by the dragging of the contact surface over the ferromagnetic surface.

According to another aspect of the disclosure, an ultrasonic testing (UT) probe alignment mechanism for a magnetic crawler and configured to align a UT probe of the magnetic crawler with respect to a ferromagnetic surface is provided. The magnetic crawler including magnetic drive wheels or treads for magnetically attaching to and driving on a ferromagnetic surface. The UT probe is for performing UT measurements of the ferromagnetic surface. The UT probe alignment mechanism comprises: a directional axle for rotating the UT probe into alignment with respect to the ferromagnetic surface; and two pairs of swing arms each pair including a linear guide coupled to the directional axle, the linear guide having a fixed point and a slidable point shared by the two swing arms in the pair. Each swing arm in the pair has a fixed curved shape and includes: a curved nonrotating contact surface for contacting and dragging along the ferromagnetic surface with the magnetic crawler; a pivot point for pivoting the swing arm in order to contact the ferromagnetic surface with the contact surface; an end point for coupling to the fixed point of the linear guide; a spring point for coupling to a spring configured to pivot the swing arm about the pivot point in order to contact the ferromagnetic surface with the contact surface; and a linkage bar for linking the swing arm from the pivot point to the slidable point of the linear guide, wherein the four swing arms of the two pairs of swing arms are arranged symmetrically about the UT probe.

In an embodiment consistent with the UT probe alignment mechanism described above, each swing arm further comprises a cylindrical magnet proximal to the contact surface and configured to bring the contact surface into magnetic attachment with the ferromagnetic surface and to rotate the swing arm about the pivot point in order to align the UT probe with respect to the ferromagnetic surface.

In an embodiment consistent with the UT probe alignment mechanism described above, the contact surface of each swing arm comprises a polymer or rubber coating configured to prevent scratching of the ferromagnetic surface by the dragging of the contact surface over the ferromagnetic surface.

In an embodiment consistent with the UT probe alignment mechanism described above, each pair of swing arms further comprises a tension spring connecting the spring point of each swing arm in the pair.

In an embodiment consistent with the UT probe alignment mechanism described above, a magnetic crawler including the UT probe alignment system is provided. The magnetic crawler further includes a compression spring for pushing the UT probe alignment system and UT probe towards the ferromagnetic surface in order to align the UT probe with respect to the ferromagnetic surface.

In an embodiment consistent with the UT probe alignment mechanism described above, the UT probe is a dry-coupled probe (DCP).

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

In various example embodiments, a perching UAV having a releasable crawler for inspecting or maintaining a structure, such as an elevated or otherwise difficult-to-access pipe or storage tank, is provided. The UAV is a hybrid UAV that has advanced capabilities to perform contact inspection jobs on curved ferromagnetic surfaces such as carbon steel pipes, storage tanks, and other structures. The UAV can fly towards a pipe to be inspected, land and perch on it autonomously, and deploy a releasable magnetic crawler to crawl around the pipe to perform, for example, elaborate inspection jobs at any angle of orientation. The crawler may also be configured to perform maintenance on the pipe. As will be appreciated from the following discussion, the UAV can land, for example, on top of, along the side of, or underneath a pipe or other structure, and in each instance is said to have landed and perched on the structure.

As discussed earlier, the inspection and maintenance of exposed metallic assets, such as pipes, storage tanks, and the like, can sometimes be difficult or impractical to perform by people. For instance, one of the top challenges in the oil and gas industry is the periodic inspection of elevated assets found in refineries, gas plants, offshore platforms, and other plants and facilities. These assets include high elevation pipes and structures that are difficult to access during inspection or maintenance jobs. Sometimes the only way for people to inspect or maintain them is to erect scaffolding in order for the inspector or engineer to access the asset and perform, for example, manual inspection using an ultrasonic testing (UT) sensor for thickness measurements. Such scaffolding is not only expensive and introduces a significant cost barrier for frequent inspection, but also poses safety concerns mainly in the form of falling and tripping hazards.

Accordingly, in example embodiments, a perching UAV having a releasable crawler provides a solution to the aforementioned technical problems by having two vehicles in a mother/child configuration. Each vehicle is designed or optimized to perform the capabilities for which it is best suited. The vehicles include a perching UAV capable of flying, landing, and perching on a pipe, and a smaller magnetic crawler that is carried by and released from the UAV after landing (e.g., while perching). The crawler can rove on the pipe and perform, for example, inspection scans such as thickness measurements using a UT sensor. For instance, in some embodiments, both the UAV and the crawler attach magnetically to the curved surface of the pipe or other asset being inspected or maintained. As such, the crawler can perform complete longitudinal or circumferential scans of the asset (even upside down with respect to gravity).

This provides for a more feasible approach than having the whole UAV crawl around the pipe, which requires larger and heavier motors and risks collisions with nearby pipes and assets, especially with limited clearance constraints. The perched UAV also saves energy (e.g., electrical energy, battery energy) by being perched on the pipe (such as on top of the pipe) as opposed to hovering near the pipe. Perching the UAV on the surface of the pipe also allows the releasable crawler to release from or re-dock with the UAV more easily than when the UAV hovers next to the pipe. In addition, perching provides more stability and reduces risks compared to hovering.

In example embodiments, a hybrid drone-crawler system used to inspect elevated assets (e.g., pipes) is provided. The drone is capable of landing on a pipe using magnetic leg(s), turn off or slow down some or all of its propellers (e.g., during perching), and release a magnetic crawler on the pipe that is able to perform inspection scans such as ultrasound testing (UT). In some embodiments, this drone-crawler system includes a lower force (or zero-force) crawler detachment mechanism and a rotatable perching/payload end (of a rotating arm) that rotates orthogonally and independently of the rotating arm in order to accommodate landing, perching, and releasing the crawler on both horizontal and vertical pipes.

In some embodiments, a metal (e.g., ferromagnetic) sheet is used as a transient surface to create an effective docking station for the crawler to be deployed on the pipe (when releasing the crawler from the docking stations) and retrieved from the pipe (when docking the crawler in the docking station). In some embodiments, magnets are used on a UT probe alignment mechanism (e.g., instead of springs) to maintain proper perpendicularity of the UT probe with the surface being inspected by the UT probe. In some embodiments, the magnetic crawler includes two drive wheels in the front of the crawler and a draggable tail in the rear of the crawler, which helps reduce complexity, space, and weight of the crawler compared to, for example, using a rear wheel or wheels. In some embodiments, an adjustable degree of freedom (such as a 90-degree rotation or rotations) for the front payload (e.g., magnetic feet, landing station, and releasable crawler) is provided to enable landing and perching on vertical pipes (as well as horizontal pipes).

In some embodiments, a perching UAV (or drone) with a releasable crawler is provided, where the drone is capable of landing on a ferromagnetic pipe using magnetic legs, turning off its propellers and perching, and releasing the crawler on the pipe. The crawler performs inspection scans such as ultrasound testing (UT). The drone has four perching legs that that are mounted on rotatable points (e.g., using a motor) on the drone to allow the drone to land on pipes at different positions (such as 12, 3 or 6 o'clock positions). The ends of the legs are magnetized (e.g., using switchable permanent magnets or electromagnets) to grip on the ferromagnetic pipe. The magnetism of the legs can be switched on for the drone while perching and be switched off for detaching (e.g., takeoff) from the pipe.

In some embodiments, a releasable crawler with automatic (e.g., passive) probe normalization is provided. The crawler has three wheels (e.g., magnetic wheels) and a mechanism to self-adjust the UT probe in order to keep it normal to the inspection surface. The self-adjusting mechanism of the crawler ensures that the housed UT probe is perpendicular on the surface that the crawler is driving over, which is essential for the accuracy of the UT probe results. Example adjusting mechanisms include a caster ball in the middle of the crawler. The caster moves vertically to sense and match the curvature of the surface. This vertical motion in turn is translated to the UT probe using a mechanism such as a 4-bar linkage or a simple link to the UT shaft in order to ensure alignment of the UT probe with the surface.

In some embodiments, a passive alignment of a probe using symmetric contact of balancing balls is provided. This mechanism self-adjusts the UT probe within the crawler. This mechanism is passive and does not rely on actuators to align the UT probe on a surface. The mechanism includes dual swing arms that are attached to ball casters and are coupled with each other through a gearing system to ensure symmetrical opening and closing of the arms with respect to the probe, which is positioned in between these swing arms. The mechanism works by changing the pitch angle of the probe in order to make it normal to the surface being inspected.

In some embodiments, a magnetic crawler with three articulated wheels for navigating pipes is provided. The crawler include two front driving wheels each having a passive degree of freedom, which enables the crawler to self-adjust to any pipe diameter by tilting and adjusting the roll angles of the front wheels in order to maintain proper contact with the surface below and remain perpendicular with respect to it. In addition, the rear wheel (third wheel) has two passive degrees of freedom, including a passive rear "caster wheel" rotation for yaw angle changes during steering and a roll angle pivot that allows for proper surface contact while driving helically across the pipe.

In some embodiments, a mechanism for docking a magnetic crawler into a UAV is provided. The mechanism provides for docking the crawler into the drone and for undocking the crawler to release it onto the pipe (or other landing surface being inspected). This mechanism includes an actuator to lower the crawler from the UAV to the surface until the crawler's magnetic wheels grab onto the pipe surface. In addition, this mechanism overcomes the magnetism of the crawler's wheels with the pipe surface by pulling the crawler upward to disengage it from the surface. This mechanism also contains passive latches that secure the crawler while the drone is flying and without requiring any power. Once the drone lands, the crawler can open the latches by driving against them to dock or undock from this mechanism.

In some embodiments, a UAV for landing on curved surfaces (such as pipes) is provided. The UAV uses bi-stable and switchable magnetic legs that magnetically attach the drone to the pipe. The legs have switchable magnets (such as those based on permanent magnets) with motors that can turn the magnets on to attach to the pipe or off to detach from it. There is no power consumed while the magnet is on. Power is only consumed by the motor during switching. In addition, each leg has a passive degree of freedom that allows it to self-adjust its orientation for different pipe diameters.

Figure 1:
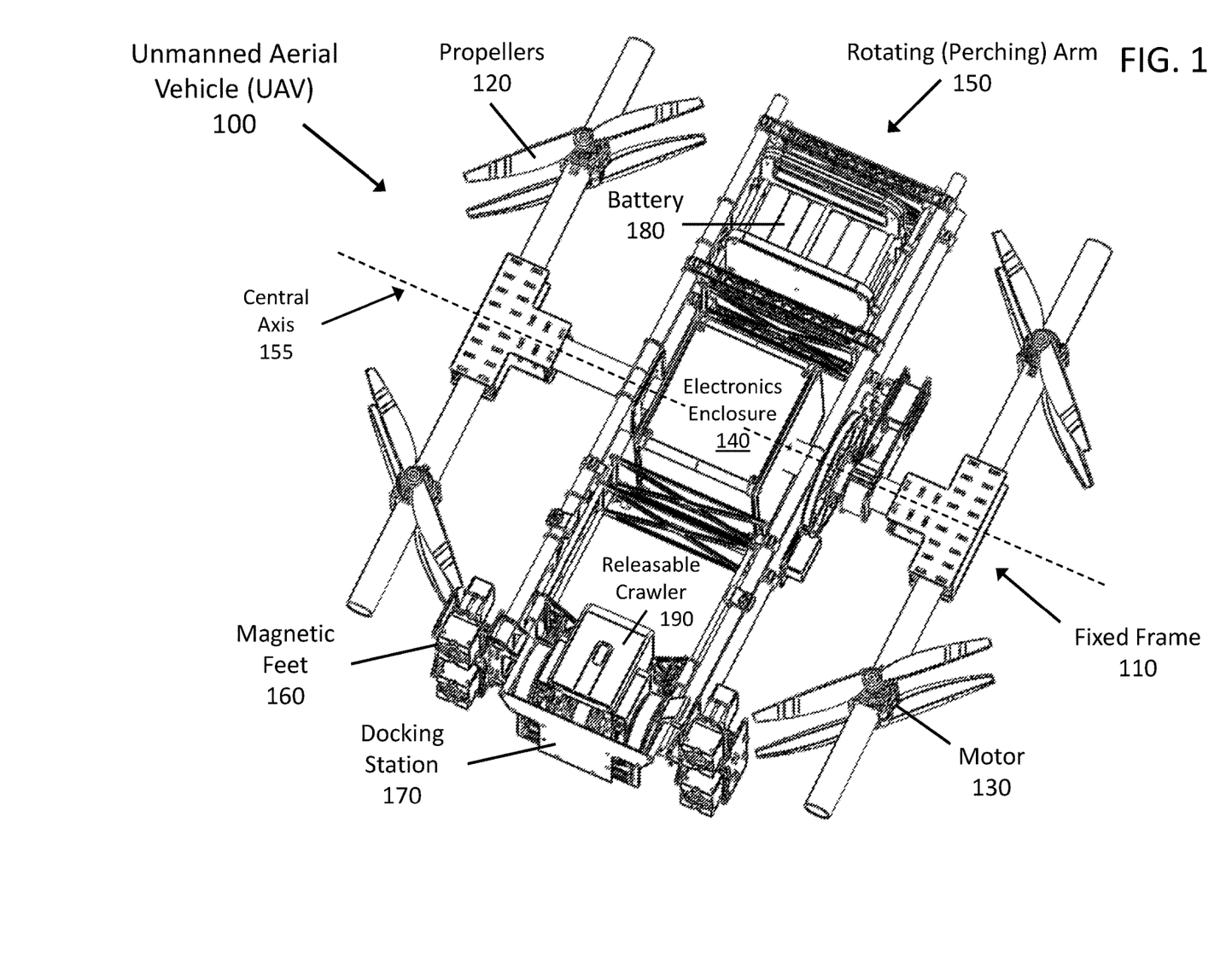
FIG. 1 is a top view of an example unmanned aerial vehicle (UAV) with attached docking station and releasable magnetic crawler for inspecting or maintaining a ferromagnetic structure (such as a pipe), according to an embodiment.

FIG. 1 is a top view of an example unmanned aerial vehicle (UAV) 100 or drone with attached docking station 170 and releasable magnetic crawler 190 for inspecting or maintaining a ferromagnetic structure (such as a pipe), according to an embodiment. The drone 100 has two main assemblies: a fixed frame 110 that includes the propellers 120 and a central electronics enclosure 140, and a rotating arm 150 that can swing forward, up, or down depending on the desired landing point on the pipe (side, bottom, or top, respectively). The arm 150 includes different components on each end. On one end (the payload end), the arm 150 includes the crawler 190, switchable magnets 160 for landing and perching, and the docking station 170. On the other end, the arm 150 includes a battery 180 that also serves as a counter weight for balance.

In further detail, the UAV 100 includes the fixed frame 110 and the rotating arm 150 (also referred to as a perching arm) that rotates with respect to the fixed frame 110 about a central axis 155 (such as 180° or more rotation to enable positioning the payload end below, level, or above the fixed frame 110). The rotating (or perching) arm 150 has magnetic feet 160 on the same end of the docking station 170 for landing and perching on the ferromagnetic structure. This allows the fixed frame 110 to move and hover in a primarily level (e.g., parallel to the ground, perpendicular to the direction of gravity) orientation, while the rotating arm (or perching arm) 150 rotates as needed to orient the magnetic feet 160 and docking station 170 towards the desired landing (and perching) location and orientation on the ferromagnetic structure. In some embodiments, the magnetic feet 160 include switchable magnets (such as switchable permanent magnets) that can be turned on during landing (and perching) and off during takeoff (and flying).

The fixed frame 110 includes the propellers 120 and corresponding motors 130 for flying the UAV 100. The fixed frame 110 also includes electronics (e.g., circuits, processors, electronic logic, to name a few) housed within the electronics enclosure 140 for controlling the UAV 100. The electronics are configured (e.g., programmed, custom built logic) to control the UAV 100, such as the rotation of the rotating arm 150 and flying of the UAV 100 using the propellers 120 and motors 130. In some embodiments, the UAV 100 includes a rotation motor along the central axis to perform the rotation of the rotating arm 150 under control of the electronics. To this end, the UAV 100 includes the battery 180 for supplying electrical power to the electronics, rotation motor, and other electrically powered components of the UAV 100, such as the motors 130 for driving the propellers 120. The battery 180 is located on the opposite end of the rotating arm 150 than the magnetic feet 160 and docking station 170 (with attached crawler 190), and serves as a counterweight for the rotating arm 150.

Figure 2A:
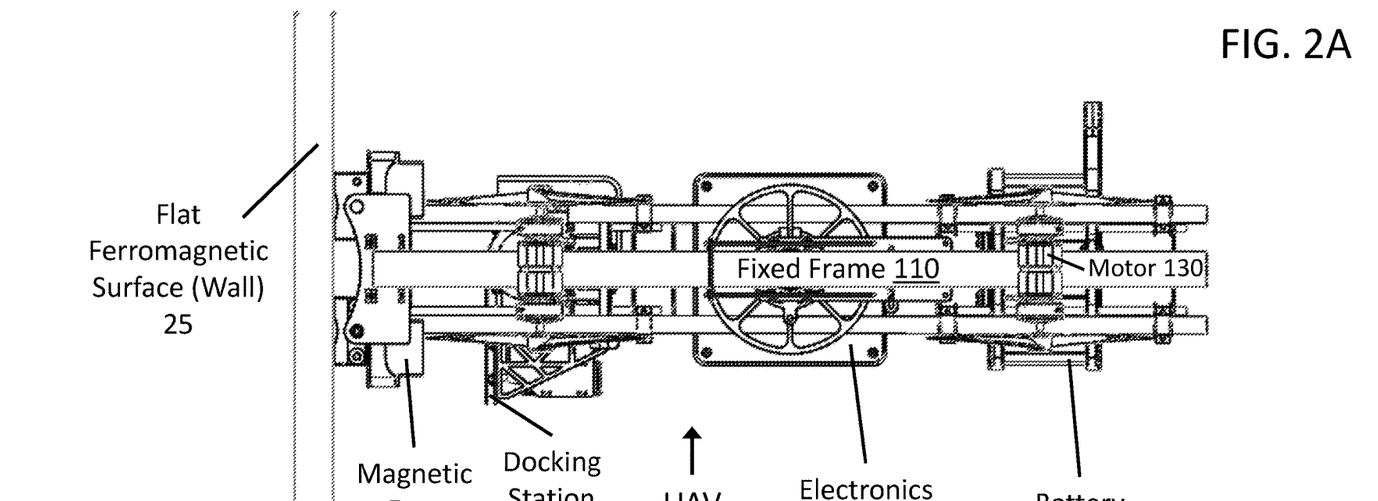
FIGS. 2A and 2B are example side views of the UAV of FIG. 1 perched from the side on a flat ferromagnetic surface (such as a wall) and on a curved ferromagnetic surface (exhibiting cylindrical curvature, such as a pipe), respectively, according to an embodiment.
Figure 2B:
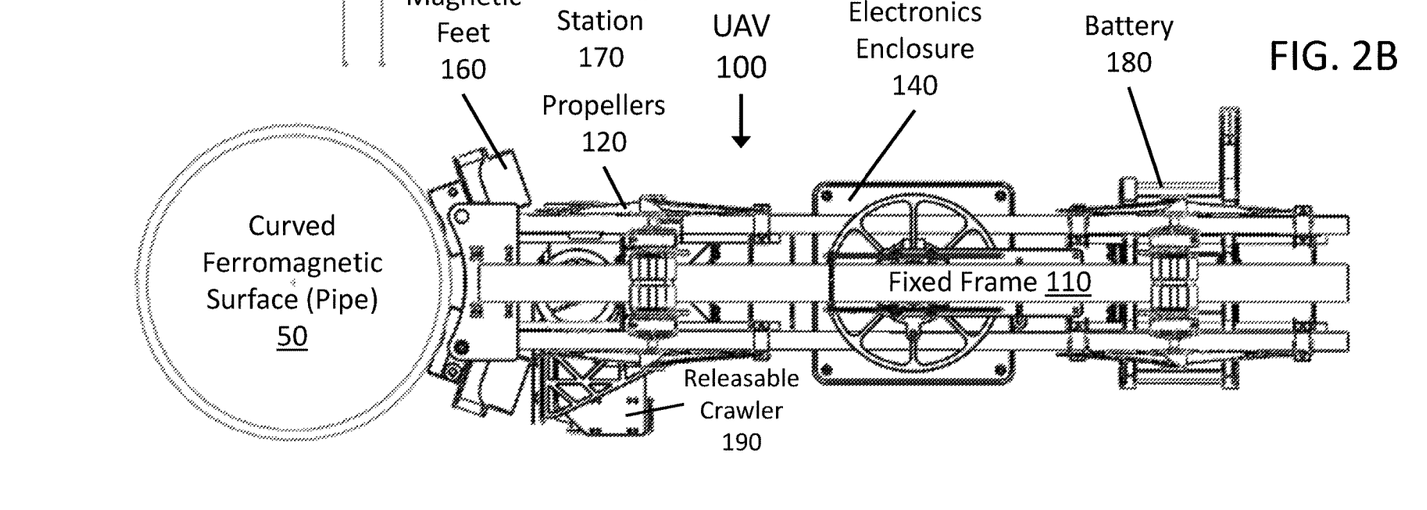

FIGS. 2A and 2B are example side views of the UAV 100 of FIG. 1 perched from the side on a flat ferromagnetic surface 25 (such as a wall) and on a curved ferromagnetic surface 50 (exhibiting cylindrical curvature, such as a pipe), respectively, according to an embodiment. For ease of illustration and description, similar or identical components of the UAV 100 are identified in FIGS. 2A-2B by the same reference numerals, but their descriptions will not be repeated. As shown in FIGS. 2A-2B, the perching magnetic legs 160 (claws) have the ability to change orientation based on the curvature of the surface (such as the diameter of the pipe 50) using a passive degree of freedom. For example, in some embodiments, each magnetic foot 160 includes a pivot axle that allows the magnetic foot 160 to pivot to a flat (or tangent) orientation with respect to the ferromagnetic surface. In FIG. 2A, the docking station 170 (and docked releasable crawler 190) is shown fully (or near fully) retracted from the wall 25, while in FIG. 2B, the docking station 170 and crawler 190 are shown partially retracted from the pipe 50.

Figure 3A:
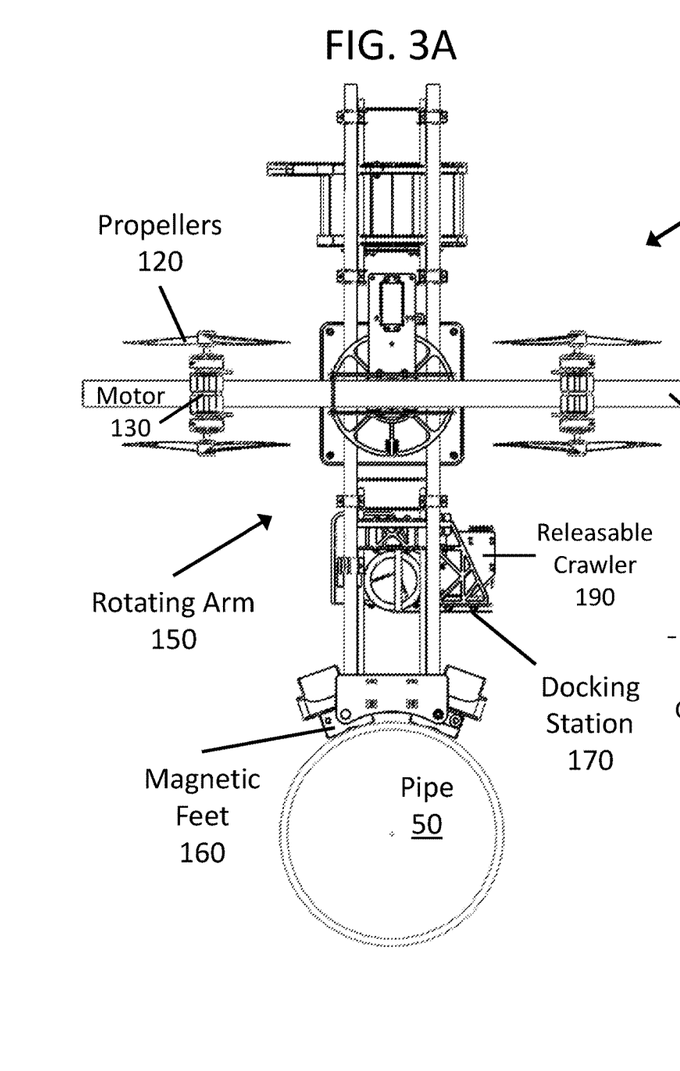
FIGS. 3A and 3B are example side views of the UAV of FIGS. 1-2B perched on the curved ferromagnetic surface of FIG. 2B from the top and from the bottom, respectively, according to an embodiment.
Figure 3B:
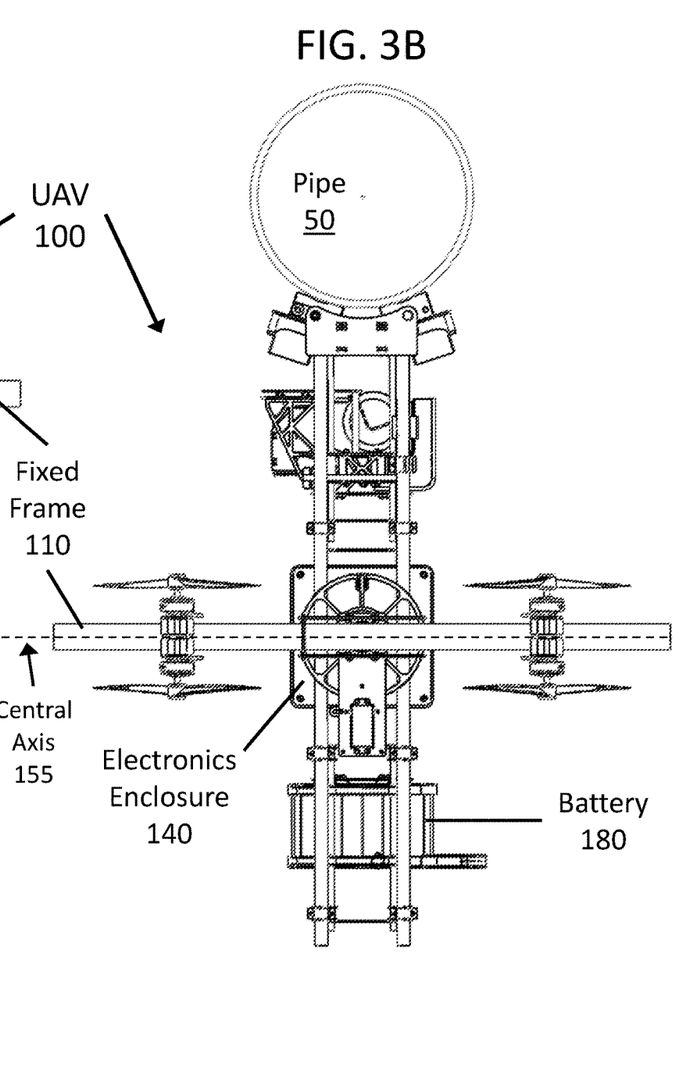

FIGS. 3A and 3B are example side views of the UAV 100 of FIGS. 1-2B perched on the curved ferromagnetic surface 50 of FIG. 2B from the top and from the bottom, respectively, according to an embodiment. As with FIGS. 2A-2B, for ease of illustration and description, similar or identical components of the UAV 100 are identified in FIGS. 3A-3B by the same reference numerals, but their descriptions will not be repeated. As shown in FIGS. 2B-3B, the rotation of the perching arm 150 translates to a corresponding rotation of the payload (including the perching magnetic legs (claws) 160, the docking station 170, and the crawler 190). This allows the drone 100 to either land on the side of the pipe 50 (FIG. 2B) by rotating the arm 150 forward, land on top of the pipe 50 (FIG. 3A) by rotating the arm 150 downward, or land on the bottom of the pipe 50 (FIG. 3B) by rotating the arm 150 upward. The battery 180 is used as a counter weight for balance to make sure that the center of gravity of the arm 150 stays in the center of the drone 100, which is important for stability, especially during arm rotation while in flight.

Figure 4A:
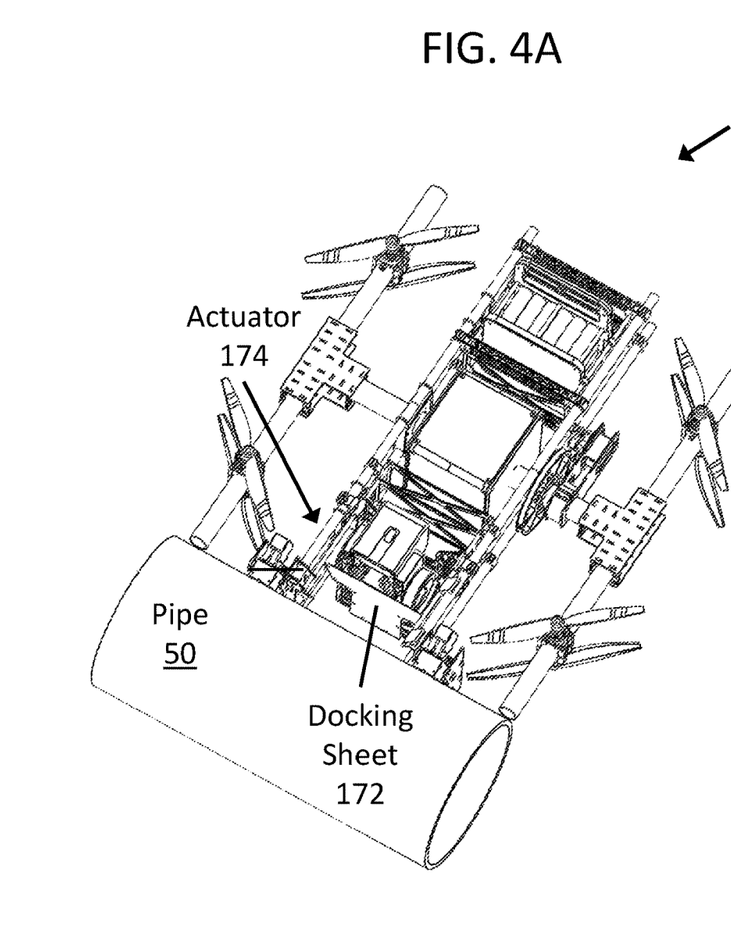
FIGS. 4A and 4B are example top views of the UAV of FIGS. 1-3B perched on the curved ferromagnetic surface of FIGS. 2B-3B from the side, with the docking station in retracted and deployed positions, respectively, according to an embodiment.
Figure 4B:
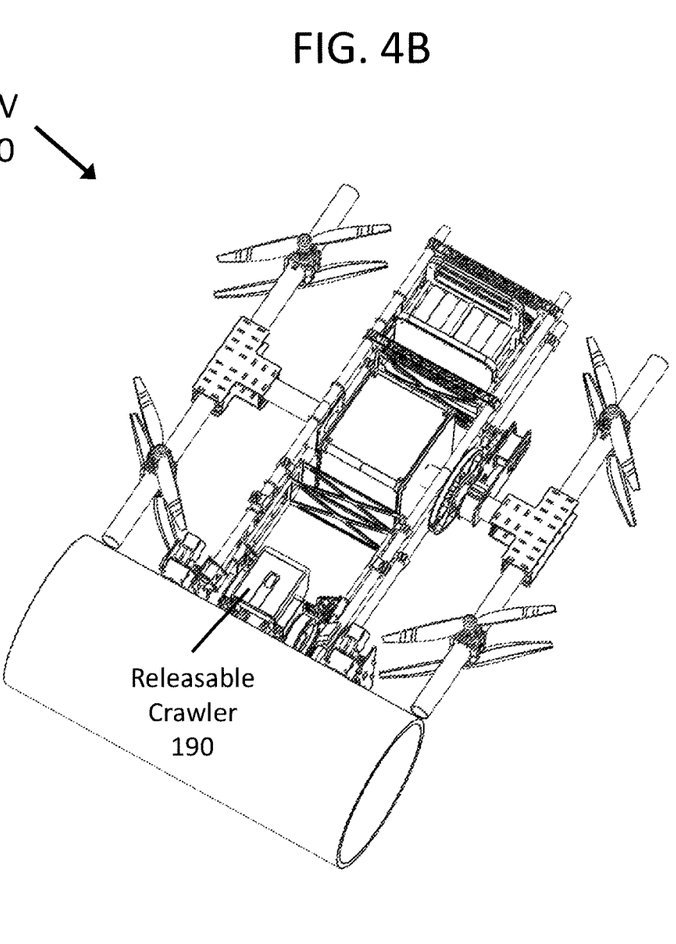
Figures 5A, 5B:
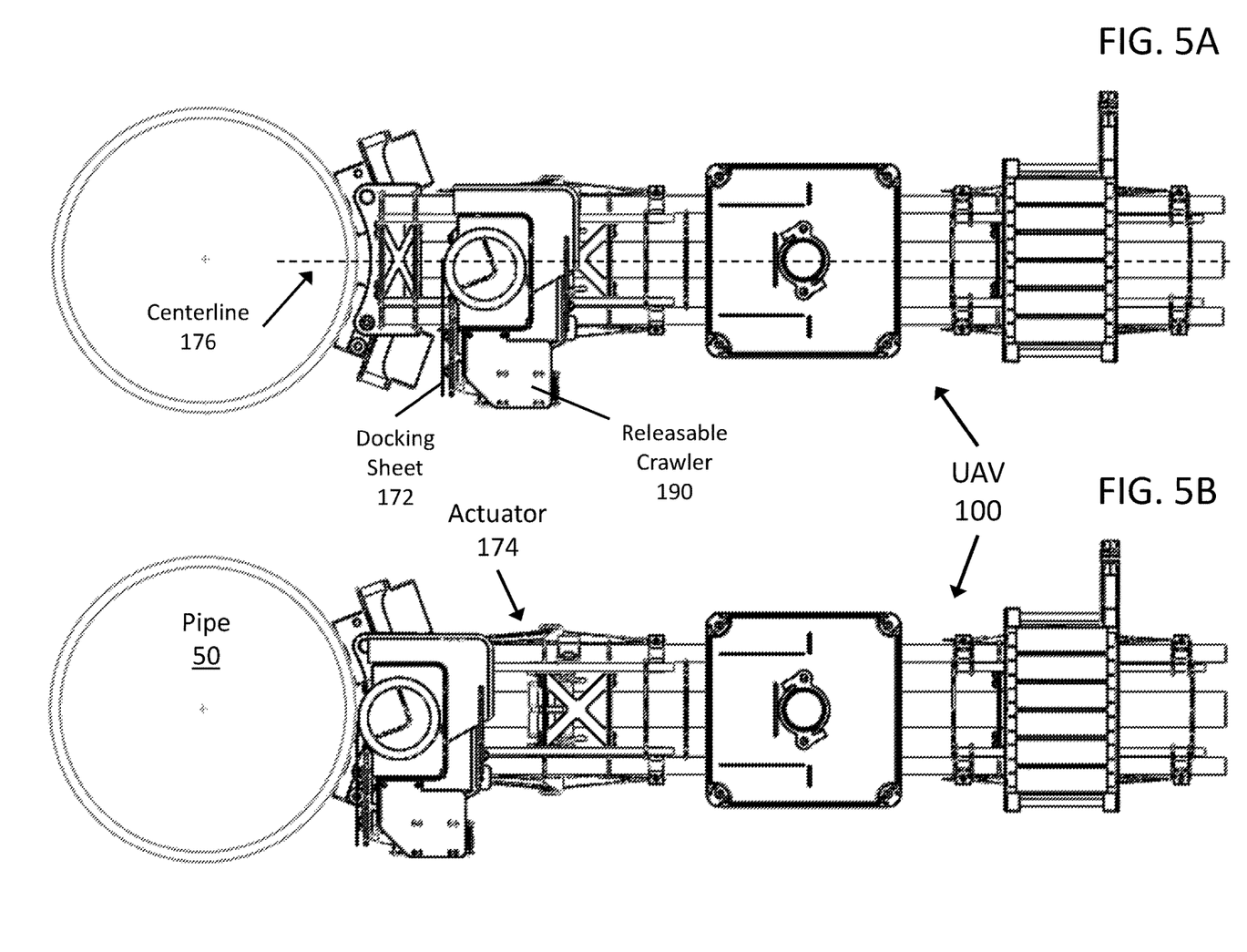
FIGS. 5A and 5B are example side views of the UAV of FIGS. 1-4B perched on the curved ferromagnetic surface of FIGS. 2B-4B from the side, with the docking station in retracted and deployed positions, respectively, according to an embodiment.
Figure 6A:
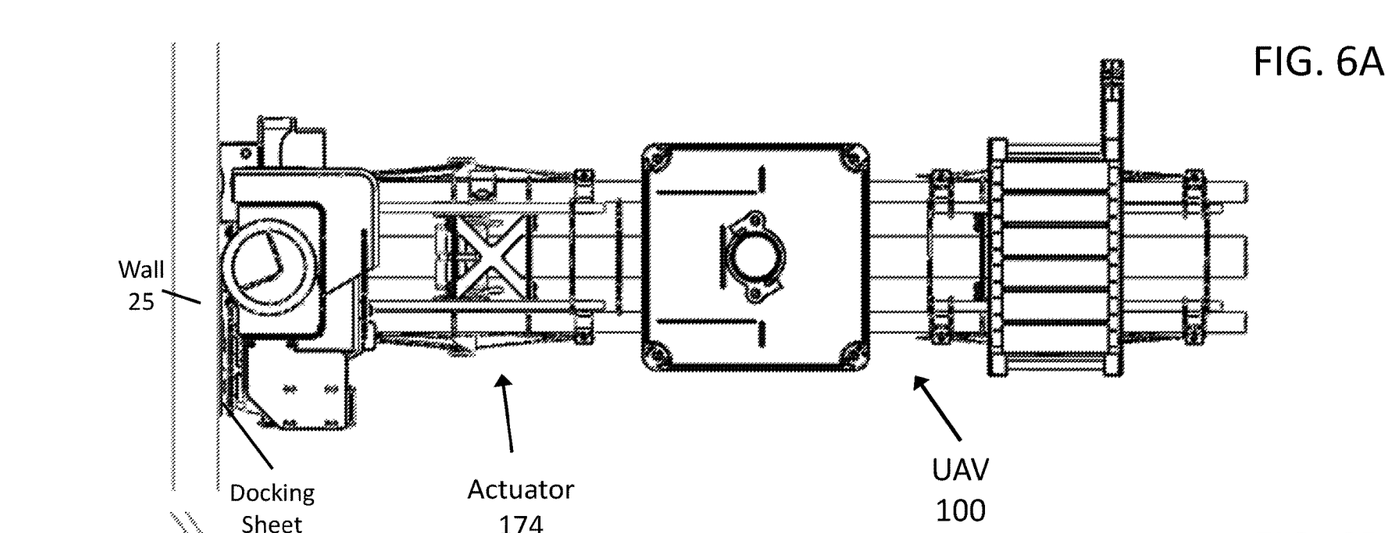
FIGS. 6A and 6B are example side views of the UAV of FIGS. 1-5B perched from the side on the flat ferromagnetic surface of FIG. 2A and on another curved ferromagnetic surface, respectively, with the docking station in deployed positions, according to an embodiment.
Figure 6B:
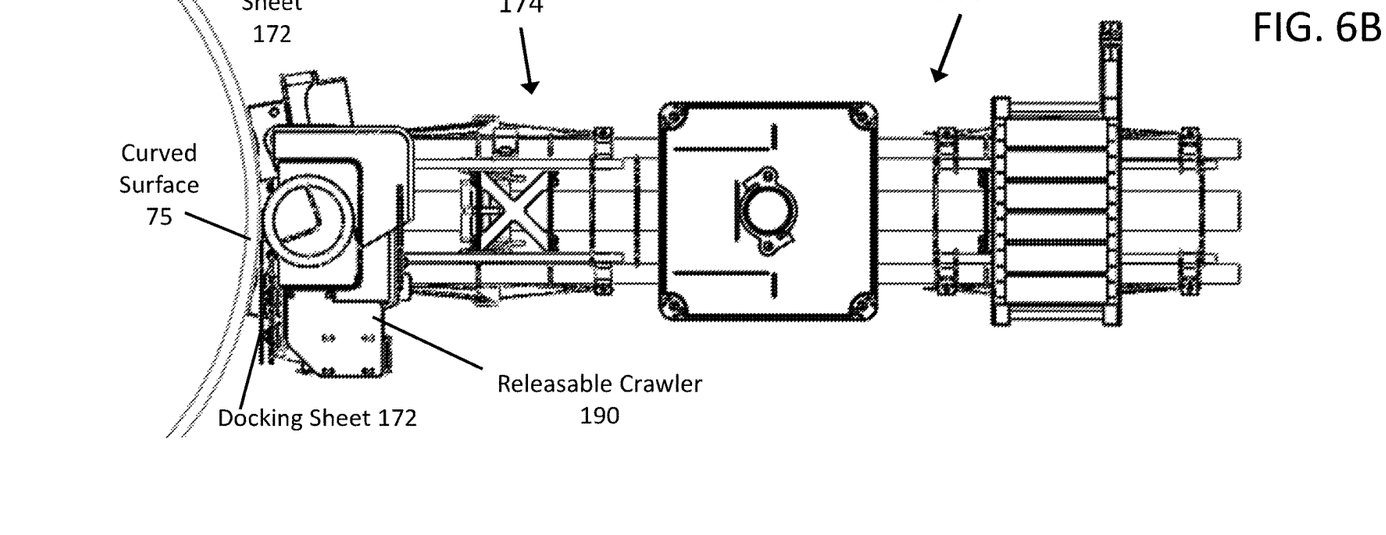

FIGS. 4A and 4B are example top views of the UAV 100 of FIGS. 1-3B perched on the curved ferromagnetic surface 50 of FIGS. 2B-3B from the side, with the docking station 170 (illustrated as docking sheet 172 and actuator 174) in retracted and deployed positions, respectively, according to an embodiment. FIGS. 5A and 5B are example side views of the UAV 100 of FIGS. 1-4B perched on the curved ferromagnetic surface 50 of FIGS. 2B-4B from the side, with the docking station 170 (including docking sheet 172 and actuator 174) in retracted and deployed positions, respectively, according to an embodiment. For ease of description, FIGS. 5A and 5B will be treated as side views of FIGS. 4A and 4B, respectively. FIGS. 6A and 6B are example side views of the UAV 100 of FIGS. 1-5B perched from the side on the flat ferromagnetic surface 25 of FIG. 2A and on another curved ferromagnetic surface 75 (such as from a larger diameter pipe than pipe 50), respectively, with the docking station 170 (including docking sheet 172 and actuator 174) in deployed positions, according to an embodiment. FIGS. 4A-6B also illustrate a releasable crawler 190 magnetically attached to the docking sheet 172.

FIGS. 4A-6B illustrate the docking station 170 in both deployed (where the docking sheet 172 touches the ferromagnetic surface) and retracted (where the docking sheet 172 is pulled back from the ferromagnetic surface) positions. The docking station 170 is used to house the crawler 190 during flight. In addition, the docking sheet 172 allows the crawler 190 to be easily deployed onto the pipe's surface and retrieved from it. This is in contrast to docking mechanisms that require brute force to detach the crawler from the pipe, which is difficult and not always reliable. Instead, the docking station 170 uses a metallic sheet 172 made of ferromagnetic material, which is used as sort of a flat transition surface, which the crawler 190 can drive on and transition from it to the pipe surface (undocking) or the other way around (docking).

In further detail, the crawler 190 includes two magnetic front drive wheels (such as omniwheels or mecanum wheels). See, for example, magnetic drive wheels 196 in FIG. 7. The magnetic drive wheels allow the crawler 190 to detach from the UAV 100 (and more specifically, the docking station 170) using the docking sheet 172 during the perching of the UAV 100. The drive wheels also allow the crawler 190 to maneuver on the ferromagnetic surface 50 after the crawler 190 is released from the UAV 100 using the docking sheet 172 as a transition surface. This transition means the magnetic wheels are always attached to a ferromagnetic surface, whether it be the pipe 50 or 75 (or other ferromagnetic surface, such as the wall 25) or the docking station 170 (e.g., docking sheet 172), so no brute force detachment is required to overcome the magnetic adhesion of the crawler 190 and the ferromagnetic surface.

In some embodiments, the leading (or inside) edge of the docking sheet 172 is flush with the longitudinal centerline (see centerline 176 in FIG. 5A) that is between the two magnetic legs (claws) 160. As such, the (inside edge of the) docking sheet 172 is flush and tangent with the pipe. Further, this flushness and tangency takes place with any pipe diameter, which makes it more straightforward to disembark and re-embark the crawler 190 from and to the docking station 170 (or more specifically, the docking sheet 172) on various surfaces.

The docking station 170 is actuated (e.g., using the actuator 174, such as a motor or a linear actuator) in order to move the docking station towards (or closer to) the pipe or periphery of the UAV 100, or towards the center of the UAV 100 or away (or farther from) the pipe. The actuator 174 allows the crawler 190 to be closer to the center of the rotating arm 150 (e.g., close to the electronics enclosure 140) during flight, approach, and contact with the ferromagnetic surface, so that the magnetic legs 160 can latch onto the pipe without risk of collision or obstruction between the pipe and the crawler 190 (or docking station 170). After attaching to the pipe, the docking station 170 moves towards the pipe and contacts it in order to release the crawler 190 and retrieve it as well after job completion.

The actuator 174 is also beneficial in that different pipe diameters require the crawler 190 to be deployed at different positions. For instance, flat surfaces require the crawler to be furthest away for the drone's center while a small diameter pipe requires deployment at a point closer to the drone's center. Therefore, moving the docking station 170 is useful for successful deployment and retrieval of the crawler 190 on different diameter pipe surfaces (in addition to flat surfaces).

Figure 7:
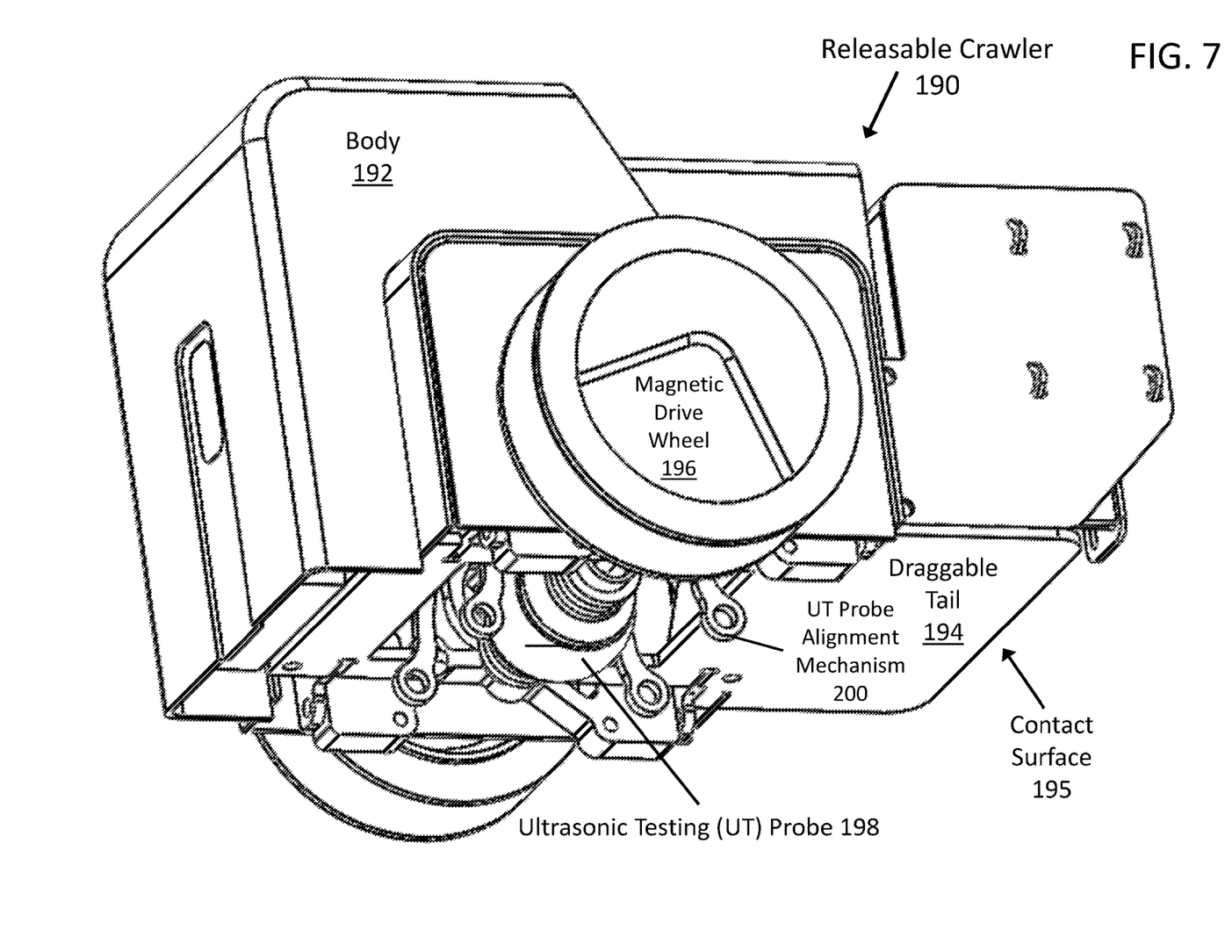
FIG. 7 is an oblique view of an example releasable crawler, such as the releasable crawler of FIGS. 1-6B, according to an embodiment.

FIG. 7 is an oblique view of an example releasable crawler 190, such as the releasable crawler 190 of FIGS. 1-6B, according to an embodiment. Instead of a rear wheel or wheels for support, the crawler 190 has a draggable tail 194 including a contact surface 195 that rests on the pipe's surface and gets dragged (and not rotated) on it while driving. In some embodiments, permanent magnets are mounted on or in close proximity to the contact surface (such as from inside or outside the crawler 190) to provide rear adhesion and support. In some embodiments, a polymer or rubber coating is applied on the contact surface 195 to prevent scratching while driving. The coating should have a low coefficient of friction in order to limit the performance impact of dragging versus rolling.

The magnetic crawler 190 further includes a body 192, left and right magnetic drive wheels 196 (attached to a front portion of the body 192), a UT probe 198, and a UT probe alignment mechanism 200 for aligning the UT probe perpendicular to the ferromagnetic surface beneath the crawler 190. It should be noted that the terms "front" and "rear," or "left" and "right," are intended to be relative to a fixed reference point, such as a center of mass of the crawler 190. The drive wheels 196 are capable of being driven independently in either direction (forward or reverse) in order to allow the crawler 190 to move in any direction on the ferromagnetic surface. In addition, the magnetic wheels 196 and magnetic contact surface 194 are sufficiently strong to allow the crawler to traverse any incline, including vertical (straight up and down) and upside down.

Figure 8:
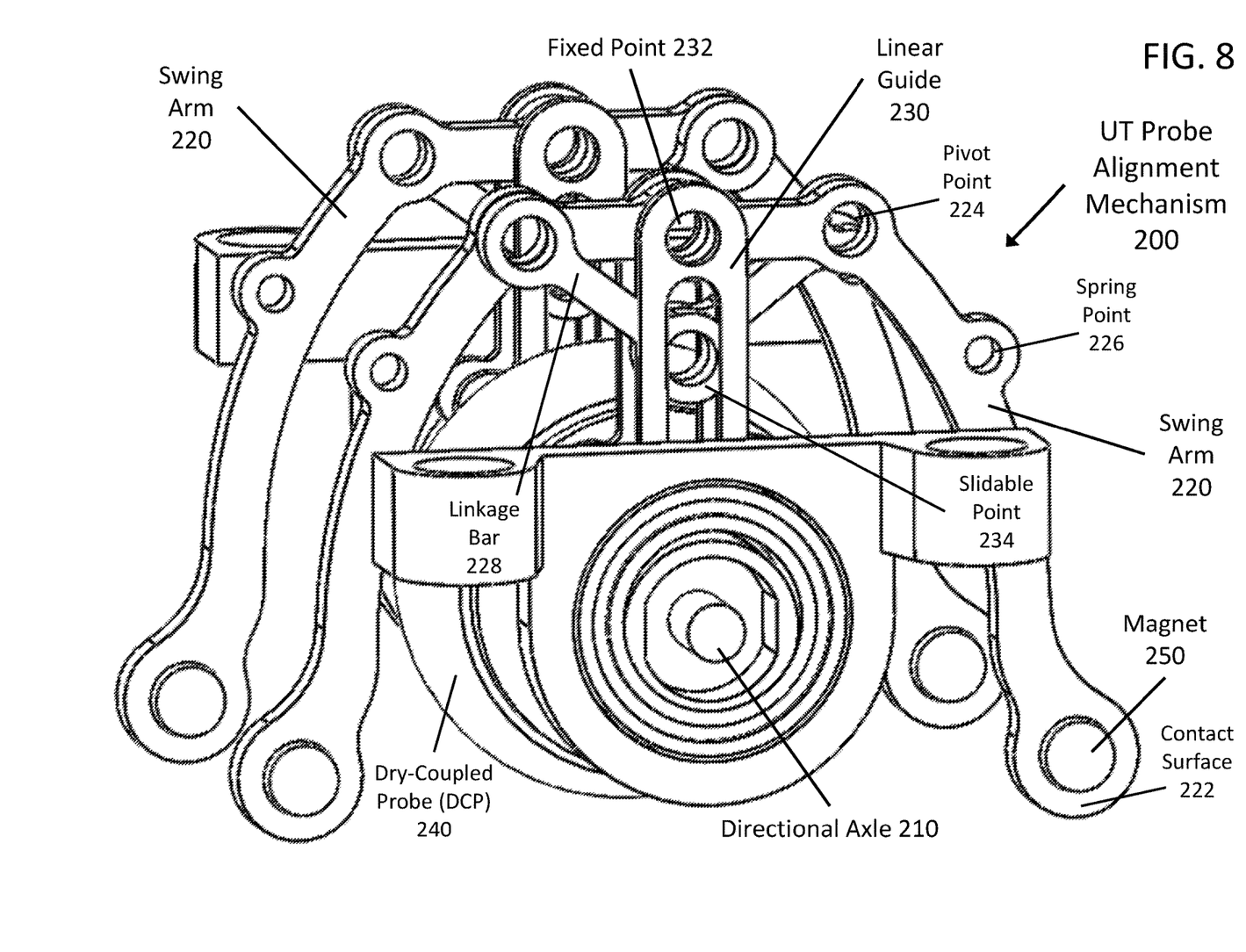
FIG. 8 is an oblique view of an example ultrasonic testing (UT) probe alignment mechanism (such as the UT probe alignment mechanism of FIG. 7) for a UT probe, such as a dry-coupled probe (DCP), in a releasable crawler, according to an embodiment.

FIG. 8 is an oblique view of an example ultrasonic testing (UT) probe alignment mechanism 200 (such as the UT probe alignment mechanism 200 of FIG. 7) for a UT probe 198, such as a dry-coupled probe (DCP) 240, in a releasable crawler, according to an embodiment. The DCP 240 has a directional axle 210 that houses a probe (such as a UT probe) while maintaining its rotation relative to the inspection surface below, and a rotatable wheel that keeps the probe at a fixed height above the inspection surface. The directional axle 210 thus rotates independently of the rotatable wheel. The UT probe alignment mechanism 200 includes four swing arms 220, arranged in two sets of two swing arms 220 apiece, one set for each side (left or right) of the UT probe (as viewed in the direction of the rotating wheel). Each pair of swing arms 220 is held together using a linear guide 230 (that connects the directional axle 210 to the swing arms 220), a pair of linkage bars 228, and a spring (such as a tension spring). As will be described further, the arrangement of the swing arms 220 and their connections to the directional axle 210 using the linear guides 230, the linkage bars 228, and the springs keeps the UT probe within the directional axle perpendicular to the surface below the UT probe.

Each swing arm 220 includes a contact surface 222 for dragging (not rotating) across the inspection surface. To this end, in some embodiments, the contact surface 222 is coated with a material having a low coefficient of friction. The curved design of the material in contact with the surface is useful so that the contact surface 222 can climb small obstacles such as pieces of dirt and small welds. In some embodiments, larger welds are traversed using, for example, contact surfaces 222 with a larger diameter, or a front wedge designed into the swing arm 222 so that the wedge aids the swing arm 222 in climbing over the weld.

In the UT probe alignment mechanism 200, the swing arms 220 maintain symmetry with one another using an intricate linkage system. As illustrated in FIG. 8, each swing arm 220 includes three linkage points: a pivot point 224, a swing point 226, and an (upper) end point (coinciding with a fixed point 232 on the linear guide 230). The pivot point 224 allows for pivoting of the swing arm 220, and is linked to the other swing arm 220 of the set by linking the corresponding end points at the fixed point 232 of the linear guide 230, and by using linkage bars 228 to connect corresponding sliding points 234 of the linear guides 230 together. This creates a slidable connection that moves up or down in the linear guide and allows the swing arms 220 to adjust the rotation of the directional axle 210 based on the pivoting induced by the contact surfaces 222 on the inspection surface below and the pivot points 224 above. In addition, a tension spring connects a corresponding pair of spring points 226 to further increase and distribute the contact of the contact surfaces 222 with the inspection surface.

The tension springs move the swing arms 220 inward. This is countered by a similar downward force moving the swing arms 220 outward so that the linkage mechanism evenly distributes the forces based on the relative height of the inspection surface as sensed by the contact surfaces 222.

In some embodiments, this is accomplished by another spring or springs (such as compression springs) applying a steady downward force on the swing arms 220 (e.g., from above) to push the swing arms 220 down against the inspection surface. In some other embodiments, small cylindrical magnets 250 are embedded in the end of each swing arm 220 near the contact surface 222 to create the same downward force against the inspection surface.

Figure 9:
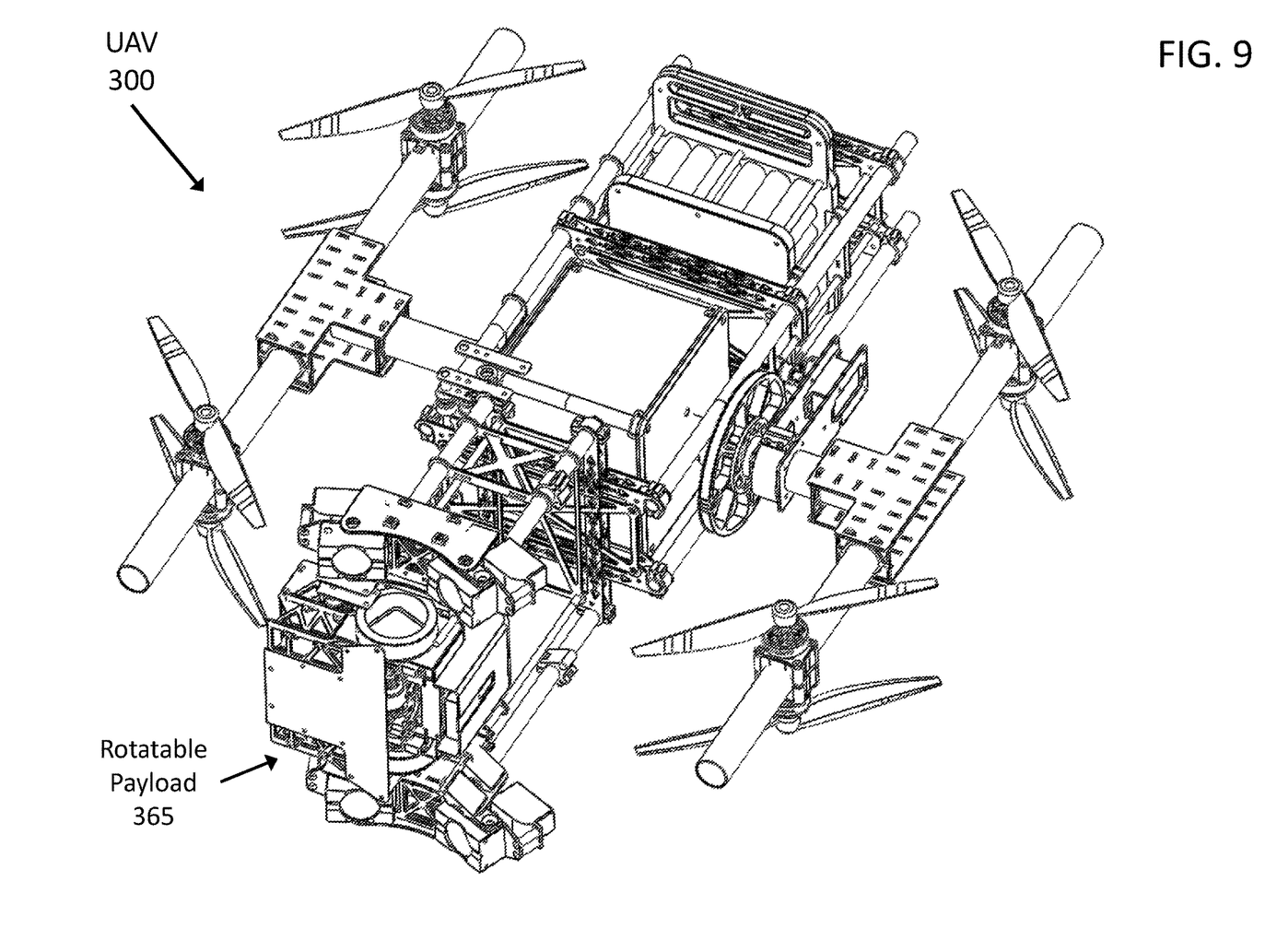
FIG. 9 is an oblique view of an example UAV having a rotatable payload (e.g., magnetic feet, docking station, and releasable crawler) for deploying the crawler on a vertical curved ferromagnetic surface (such as a vertical pipe), according to an embodiment.

FIG. 9 is an oblique view of an example UAV 300 having a rotatable payload 365 (e.g., magnetic feet 160, docking station 170, and releasable crawler 190) for deploying the crawler 190 on a vertical curved ferromagnetic surface (such as a vertical pipe), according to an embodiment. The UAV 300 is a non-limiting example of how the payload end of the rotating arm can be adjusted to accommodate vertical and horizontal pipes as the ferromagnetic surface. With a vertical pipe, the docking sheet 172 (and the rest of the payload 365) needs to be rotated 90° (with respect to that needed for a horizontal pipe) in order to make tangential contact with the vertical pipe. Accordingly, the UAV 300 has a rotatable payload 365 that is rotatable (such as by 90°) or reconfigurable to effect such a rotation. It should be noted that this payload rotation is with respect to a longitudinal (lengthwise) axis of the rotating arm (that is perpendicular to the central axis 155 about which the rotating arm rotates with respect to the fixed frame).

The drone 300 is designed to land not only on horizontal pipes but vertical ones as well. To do this, a mechanism is provided to allow for a 90-degree rotation for the front payload 365 including the crawler 190, docking station 170, and perching magnetic legs (claws) 160. In some embodiments, this mechanism is manually adjustable by the operator before the flight. In some embodiments, the mechanism is motorized to allow for in-flight rotation. For example, the mechanism shown in FIG. 9 requires the operator to detach the front payload 365, which is connected using four mounting points, and reattaching the payload 365 after rotating it by 90 degrees. In some embodiments, a manual turntable that provides 90-degree rotation (with clicking on desired positions) is used between the payload 365 and the remainder of the arm for easy switching between the two configurations.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An unmanned aerial vehicle (UAV) comprising:
   a fixed frame including:
      peripheral propellers and corresponding motors for flying the UAV; and
      a central electronics enclosure for housing electronics used to control the UAV; and
   a rotating arm pivotably coupled to the fixed frame at a central axis between the propellers and configured to rotate with respect to the fixed frame about the central axis, the rotating arm including:
      magnetic feet at a first end of the rotating arm and configured to perch and magnetically attach the UAV to a ferromagnetic surface;
      a docking station at the first end and configured to release and dock a releasable crawler on and from the ferromagnetic surface; and
      a battery at a second end of the rotating arm opposite the first end and configured to supply power to the motors and the housed electronics, and to counterbalance the first end about the central axis.

2. The UAV of claim 1, wherein the first end of the rotating arm is adjustable to accommodate vertical and horizontal pipes as the ferromagnetic surface.

3. The UAV of claim 2, wherein the rotating arm extends along a longitudinal axis perpendicular to the central axis and going through the docking station, and the first end of the rotating arm is reconfigurable to rotate the first end about the longitudinal axis relative to a remainder of the docking station by 90°.

4. The UAV of claim 3, wherein the rotation arm further comprises a payload motor powered by the battery and configured to rotate the first end of the rotating arm about the longitudinal axis relative to the remainder of the docking station.

5. The UAV of claim 1, wherein the rotating arm is further configured to:
   rotate its first end down with respect to the fixed frame in order to perch the UAV and release the crawler on a top of the ferromagnetic surface;
   rotate its first end up with respect to the first frame in order to perch the UAV and release the crawler on a bottom of the ferromagnetic surface; and
   rotate its first end even with respect to the fixed frame in order to perch the UAV and release the crawler on a side of the ferromagnetic surface.

6. The UAV of claim 1, wherein the magnetic feet are further configured to passively pivot in a first orientation in order to perch and magnetically attach the UAV to a flat ferromagnetic surface, and passively pivot in a second orientation different from the first orientation in order to perch and magnetically attach the UAV to a curved ferromagnetic surface exhibiting cylindrical curvature.

7. The UAV of claim 6, wherein the magnetic feet are further configured to passively pivot in the second orientation in order to perch and magnetically attach the UAV to a curved ferromagnetic surface exhibiting cylindrical curvature with a first radius of curvature, and to passively pivot in a third orientation different from the first and second orientations in order to perch and magnetically attach the UAV to a curved ferromagnetic surface exhibiting cylindrical curvature with a second radius of curvature different from the first radius of curvature.

8. The UAV of claim 1, wherein the magnetic feet comprise switchable magnets powered by the battery and configured to switch their magnetism on and off under control of the housed electronics, the switchable magnets being further configured to:
   switch their magnetism on in order to magnetically attach the UAV to the ferromagnetic surface during a perching of the UAV on the ferromagnetic surface; and
   switch their magnetism off in order to magnetically detach the perched UAV from the ferromagnetic surface during a takeoff of the UAV from the ferromagnetic surface.

9. The UAV of claim 1, further comprising a rotation motor powered by the battery and configured to rotate the rotating arm with respect to the fixed frame about the central axis under control of the housed electronics during flight of the UAV.

* * * * *